United States Patent
Zhao et al.

(10) Patent No.: US 10,696,164 B2
(45) Date of Patent: Jun. 30, 2020

(54) OPTIMIZING REGENERATIVE BRAKING EFFICIENCY IN A HYBRID VEHICLE

(71) Applicant: Ford Global Technologies, LLC, Dearborn, MI (US)

(72) Inventors: Yanan Zhao, Ann Arbor, MI (US); Ming Lang Kuang, Canton, MI (US); Zheng Liu, Canton, MI (US); Chen Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 15/598,569

(22) Filed: May 18, 2017

(65) Prior Publication Data

US 2018/0334038 A1  Nov. 22, 2018

(51) Int. Cl.
*B60L 7/18* (2006.01)
*F16D 61/00* (2006.01)
(Continued)

(52) U.S. Cl.
CPC .................... *B60L 7/18* (2013.01); *B60K 6/48* (2013.01); *B60L 3/0076* (2013.01); *B60L 15/2009* (2013.01); *B60L 15/2045* (2013.01); *B60L 50/61* (2019.02); *B60T 1/10* (2013.01); *B60T 7/22* (2013.01); *B60T 13/586* (2013.01); *B60W 10/02* (2013.01); *B60W 10/026* (2013.01); *B60W 10/08* (2013.01); *B60W 30/16* (2013.01); *B60W 30/18127* (2013.01); *F16D 61/00* (2013.01); *B60K 2006/4825* (2013.01); *B60L 2240/12* (2013.01); *B60L 2240/423* (2013.01); *B60L 2240/443* (2013.01); *B60L 2240/486* (2013.01); *B60L 2240/80* (2013.01); *B60T 2201/02* (2013.01); *B60T 2270/60* (2013.01); *B60T 2270/604* (2013.01);
(Continued)

(58) Field of Classification Search
None
See application file for complete search history.

(56) References Cited

U.S. PATENT DOCUMENTS 5,895,100 A   4/1999   Ito et al.
7,136,737 B2  11/2006  Ashizawa et al.
(Continued)

FOREIGN PATENT DOCUMENTS

JP   H110243501 A   9/1998
JP   2014100999 A   6/2014

OTHER PUBLICATIONS

Yu et al., "Regenerative Braking Torque Estimation and Control Approaches for a Hybrid Electric Truck", Year: 2010, 6 pages.
(Continued)

*Primary Examiner* — Navid Ziaeianmehdizadeh
(74) *Attorney, Agent, or Firm* — David Kelley; Brooks Kushman P.C.

(57) ABSTRACT

A vehicle includes a motor and a controller. The controller is programmed to, responsive to an autonomous braking request and a predicted average braking torque associated with the request having a magnitude less than a powertrain regenerative torque limit, brake the vehicle only with the motor according to a torque profile adapted from a most efficient torque profile of the motor so as to have an average value falling within a specified range of the average braking torque.

16 Claims, 7 Drawing Sheets

(51) Int. Cl.
*B60L 15/20* (2006.01)
*B60T 1/10* (2006.01)
*B60W 30/16* (2020.01)
*B60W 10/02* (2006.01)
*B60K 6/48* (2007.10)
*B60L 50/61* (2019.01)
*B60L 3/00* (2019.01)
*B60W 30/18* (2012.01)
*B60W 10/08* (2006.01)
*B60T 7/22* (2006.01)
*B60T 13/58* (2006.01)
*B60W 10/06* (2006.01)
*B60W 20/14* (2016.01)

(52) U.S. Cl.
CPC ............... *B60W 2510/1005* (2013.01); *B60W 2710/083* (2013.01); *Y10S 903/947* (2013.01)

(56) References Cited

U.S. PATENT DOCUMENTS

| | | | |
|---|---|---|---|
| 7,647,997 B2 | 1/2010 | Oliver | |
| 8,998,352 B2 | 4/2015 | Imamura | |
| 10,137,881 B2* | 11/2018 | Choi | B60W 20/14 |
| 10,183,662 B1* | 1/2019 | Bonny | B60W 10/06 |
| 10,272,913 B2* | 4/2019 | Boisvert | B60L 3/106 |
| 2003/0006076 A1 | 1/2003 | Tamor | |
| 2003/0184152 A1* | 10/2003 | Cikanek | B60K 6/48 |
| | | | 303/152 |
| 2004/0122579 A1 | 6/2004 | Ashizawa et al. | |
| 2005/0200197 A1* | 9/2005 | Crombez | B60L 7/18 |
| | | | 303/152 |
| 2008/0100129 A1 | 5/2008 | Lubbers | |
| 2008/0318728 A1* | 12/2008 | Soliman | B60L 50/16 |
| | | | 477/4 |
| 2010/0113214 A1 | 5/2010 | Krueger et al. | |
| 2010/0113215 A1 | 5/2010 | Jager et al. | |
| 2010/0138117 A1 | 6/2010 | Witte | |
| 2010/0179010 A1 | 7/2010 | Kuzuya et al. | |
| 2012/0203406 A1 | 8/2012 | Akebono et al. | |
| 2012/0299367 A1 | 11/2012 | Ross et al. | |
| 2013/0090822 A1* | 4/2013 | Schwindt | B60K 31/0008 |
| | | | 701/70 |
| 2013/0162009 A1 | 6/2013 | Mitts et al. | |
| 2013/0204472 A1* | 8/2013 | Pfefferl | B60L 58/12 |
| | | | 701/22 |
| 2014/0183933 A1 | 7/2014 | Kuhlman | |
| 2014/0350789 A1 | 11/2014 | Anker et al. | |
| 2015/0375747 A1 | 12/2015 | Shishido et al. | |
| 2016/0039292 A1 | 2/2016 | Takahashi | |
| 2016/0121727 A1 | 5/2016 | Kim et al. | |
| 2016/0144721 A1 | 5/2016 | Soo et al. | |
| 2016/0176413 A1 | 6/2016 | Oguri | |
| 2016/0257288 A1 | 9/2016 | Miller et al. | |
| 2017/0144651 A1 | 5/2017 | Park | |
| 2017/0151940 A1 | 6/2017 | Nakamura et al. | |
| 2017/0257055 A1 | 9/2017 | Kitaori et al. | |
| 2018/0079313 A1 | 3/2018 | Foitzik et al. | |
| 2018/0079418 A1* | 3/2018 | Iwasa | B60K 6/40 |
| 2018/0093571 A1 | 4/2018 | Hall et al. | |
| 2018/0093572 A1 | 4/2018 | Hall et al. | |
| 2018/0154777 A1 | 6/2018 | Hall et al. | |

OTHER PUBLICATIONS

Liang et al., "Optimal Regenerative Torque Control to Maximize Energy Recapture of Electric Vehicles", Year: 2010, 6 pages.

* cited by examiner

OPTIMIZING REGENERATIVE BRAKING EFFICIENCY IN A HYBRID VEHICLE

TECHNICAL FIELD

This disclosure relates to optimizing regenerative braking efficiency in a vehicle equipped with regenerative braking. More specifically, this disclosure relates to a fully-autonomous or semi-autonomous vehicle that automatically activates a braking event in a manner that attempts to optimize the amount of energy recaptured via regenerative braking during the braking event.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine. The hybrid powertrain is also capable of preforming regenerative braking where the electric machine brakes the vehicle by converting mechanical power into electrical power to recharge the battery.

SUMMARY

According to one embodiment, a vehicle includes a motor and a controller. The controller is programmed to, responsive to an autonomous braking request and a predicted average braking torque associated with the request having a magnitude less than a powertrain regenerative torque limit, brake the vehicle only with the motor according to a torque profile adapted from a most efficient torque profile of the motor so as to have an average value falling within a specified range of the average braking torque.

According to another embodiment, a vehicle includes a traction battery, an engine, and a step-ratio transmission having multiple discrete gear ratios. A motor is selectively connectable to the engine, the transmission, or both, and is configured to perform regenerative braking. A controller is programmed to, in response to autonomous braking event being requested, brake the vehicle only with the motor according to a torque profile that has, for one of the gear ratios, a first value derived by setting a torque of the motor to a most-efficient torque of the motor for the one of the gear ratios and that has, for another of the gear ratios, a second value derived by setting a torque of the motor to a most-efficient torque of the motor for the another of the gear ratios.

According to yet another embodiment, method of regeneratively braking an autonomous vehicle is presented. The method includes, responsive to a predicted autonomous braking event being requested and a predicted average braking torque of the braking event having a magnitude less than a powertrain regenerative torque limit, braking the vehicle only with an electric machine according to a torque profile adapted from a most efficient torque profile of the electric machine so as to have an average value falling within a specified range of the average braking torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
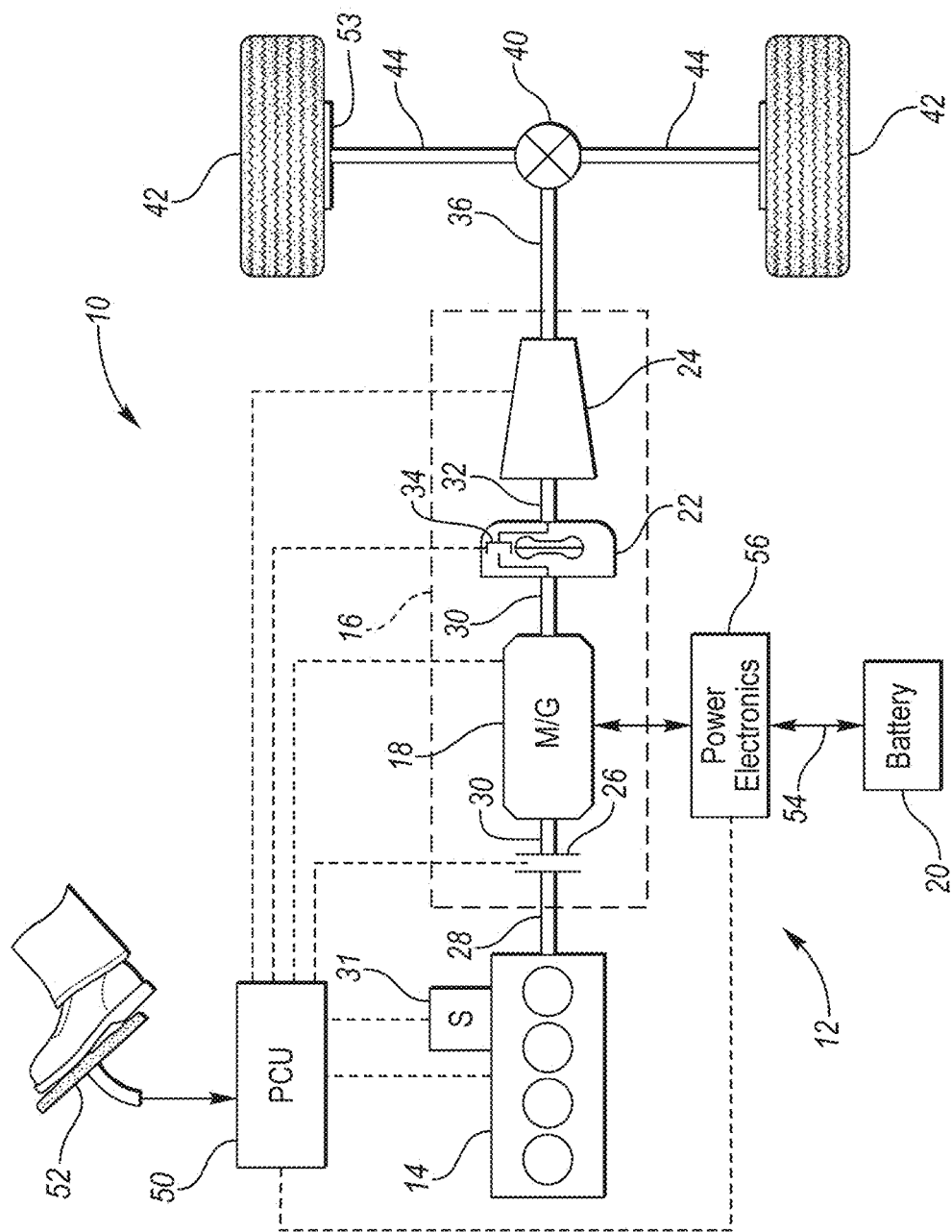
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Along with regenerative braking capabilities, the vehicle 10 is also provided with conventional friction brakes 53 at the wheels which, like the regenerative braking, can be activated autonomously or by depression of a brake pedal. These can be controlled by, for example, a hydraulic brake system. The friction brakes can selectively provide the braking force for the vehicle, depending on the availability of the regenerative braking system. The amount of friction braking can vary. For example, if the state of charge of the battery 20 is relatively high (e.g., above a high threshold), then regenerative braking may be disabled for at least a portion of the braking event in order to prevent overcharging of the battery. Instead, the friction brakes 53 can be activated to slow the vehicle. In certain braking situations, the friction braking can be used to supplement the regenerative braking, or vice versa, to provide an overall brake force necessary to brake the vehicle while also maximizing the amount of regenerative braking.

Autonomous and semi-autonomous vehicles have an ability to automatically command and control the brakes of the vehicle without driver initiation. The vehicle may be equipped with a sensor configured to detect a distance to an external object (a stop sign, another vehicle, a stop light, etc.) that the vehicle is approaching.

Figure 2:
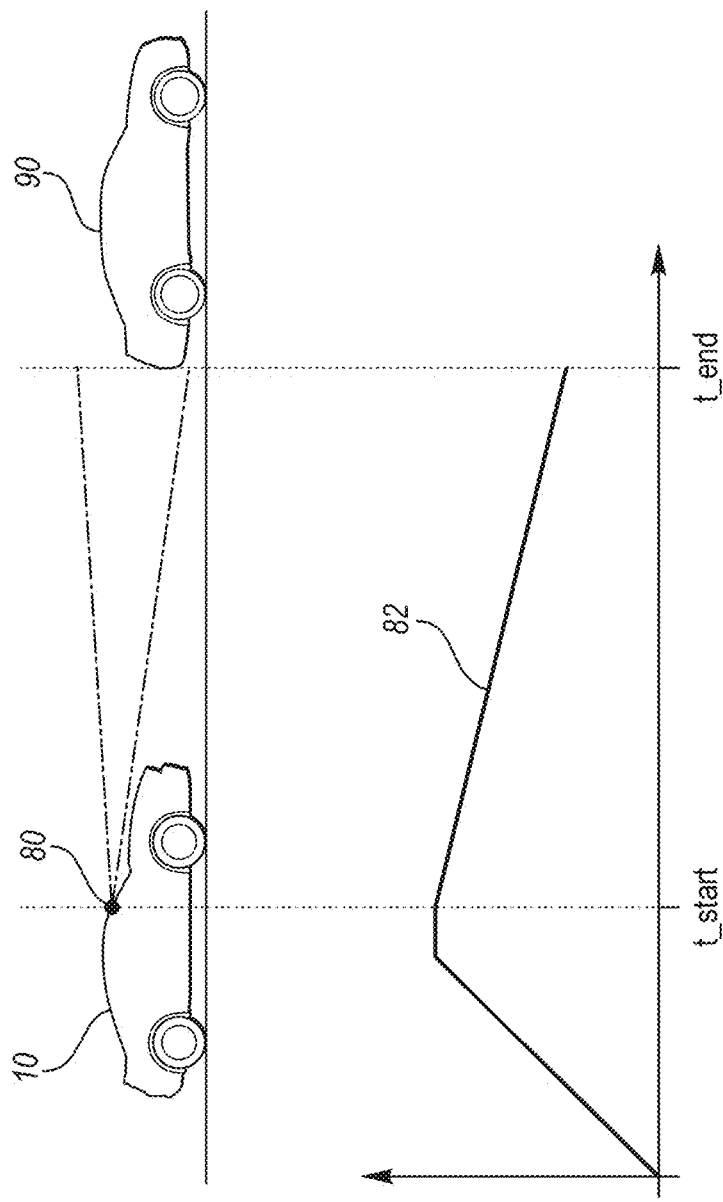
FIG. 2A is a schematic view of the vehicle equipped with a sensor configured to detect a distance to another vehicle in front of the vehicle.
FIG. 2B is a graph of a desired vehicle deceleration during that distance to safely slow or stop the vehicle.

FIGS. 2A and 2B show an example driving scenario in which the vehicle 10 is provided with a sensor 80 coupled to a controller. The vehicle 10 is following a leading vehicle 90 that is in front of the vehicle 10. Based on information gathered from the sensor 80, the controller determines a need to slow down the vehicle to maintain a safe following distance from the leading vehicle 90. The controller associated with the sensor 80 may define a deceleration 82 necessary to maintain the safe following distance. The time to safely brake the vehicle 10 is dependent on the speed of the vehicle 10, the vehicle 90, and the distance between the vehicles 10 and 90. The controller can construct the deceleration of the vehicle to occur over the necessary time (i.e., between t_start and t_end).

The present disclosure provides control strategies for constructing a vehicle speed profile or a braking torque profile, depending upon the embodiment, used during a regenerative-braking event to maximize the amount of electrical power captured during the regenerative-braking event.

In normal driving operations, the amount of regenerative braking capable of being performed is limited by and can be predicted by the characteristics of the powertrain. This is referred to herein as the powertrain regenerative torque limit (PT limit). As used herein, the PT limit refers to torque at the wheels, as opposed to some other domain of the powertrain. The characteristics that affect the PT limit may include the state of charge of the battery 20, the regenerative torque limits of the M/G 18, the brake stability limit, and the transmission's capability to support regenerative braking. The transmission's capability to support regenerative braking is gear-dependent for vehicles with the architecture of vehicle 10, and can be a dominant factor in high gears. Generally, the PT limit is less in higher gears, e.g., $5^{th}$ gear, than it is in lower gears, e.g., $2^{nd}$ gear due to the torque multiplication in the gear box.

It should be noted that in describing these figures and the relationships between the values, the torque values are illustrated as negative values because they are brake torques ("negative torques"). All relative terms, e.g., higher, lower, etc., describing torque refer to absolute values. For example, when a first torque value or magnitude is "higher than" a second torque value or magnitude, it is intended to mean that the first value or magnitude is more negative than the second value or magnitude.

The present disclosure provides various embodiments to accomplish the braking event while capturing as much regenerative energy as possible while still braking the vehicle appropriately and at a generally constant deceleration that is desired for driver experience.

Figure 3:
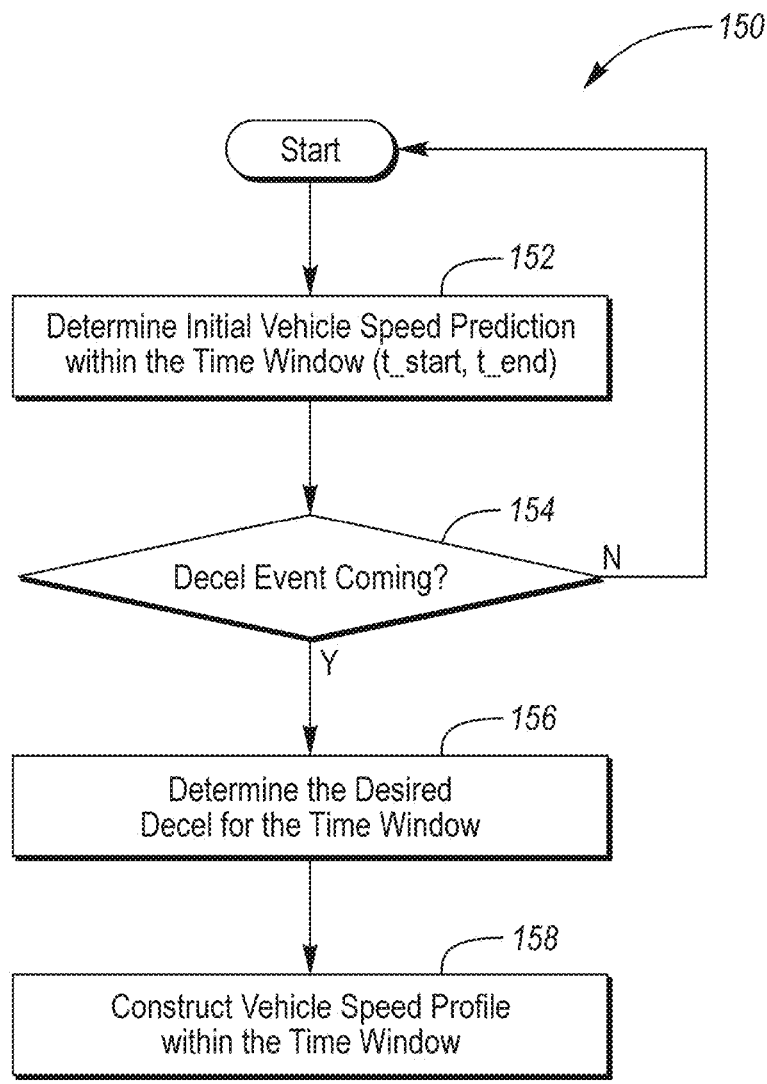
FIG. 3 illustrates a flow chart for constructing a speed profile of the vehicle during a braking event of the vehicle.

A vehicle speed profile and/or associated brake torque profile can be constructed by the controller to meet an average deceleration considering the regenerative-braking efficiency. FIG. 3 illustrates a flow chart 150 that lays out a conceptual overview for constructing a speed profile for the vehicle 10 during an example braking event. The flow chart 150, like others described in this disclosure, can be implemented by the controller. At operation 152, the controller may utilize data received from the sensor 80 and other sources to determine an initial vehicle speed prediction within the time window (t_start, t_end) to safely brake the vehicle. If there is no necessary braking event, then control returns to the start and constantly monitors the speed of the vehicle and the distance to objects in front of the vehicle. If a braking event is required at operation 154, then at operation 156 the controller determines a desired deceleration for the time window to safely stop or slow the vehicle. At 158, the controller constructs a vehicle speed profile within the time window for regenerative braking efficiency while meeting the desired deceleration. In other words, the controller can construct various speed profiles that all have the same average deceleration, understanding that some speed profiles can yield more efficient regenerative braking than others while sacrificing a small delineation from a constant deceleration. For example, it may be desirable to brake the vehicle with a first brake torque, and then later in the braking event, brake the vehicle with a second, larger brake torque in order to recapture more electric energy from the regenerative braking during the braking event.

Using the teachings provided above, the controller can (1) establish that a braking event should automatically take place, (2) determine the PT limit for each gear ratio of the transmission during the upcoming braking event, (3) determine a necessary deceleration required to successfully stop or slow the vehicle within the time window before contacting the forward vehicle or other object, and (4) determine the average desired or necessary brake torque during the braking event to successfully stop the vehicle.

Figure 4A:
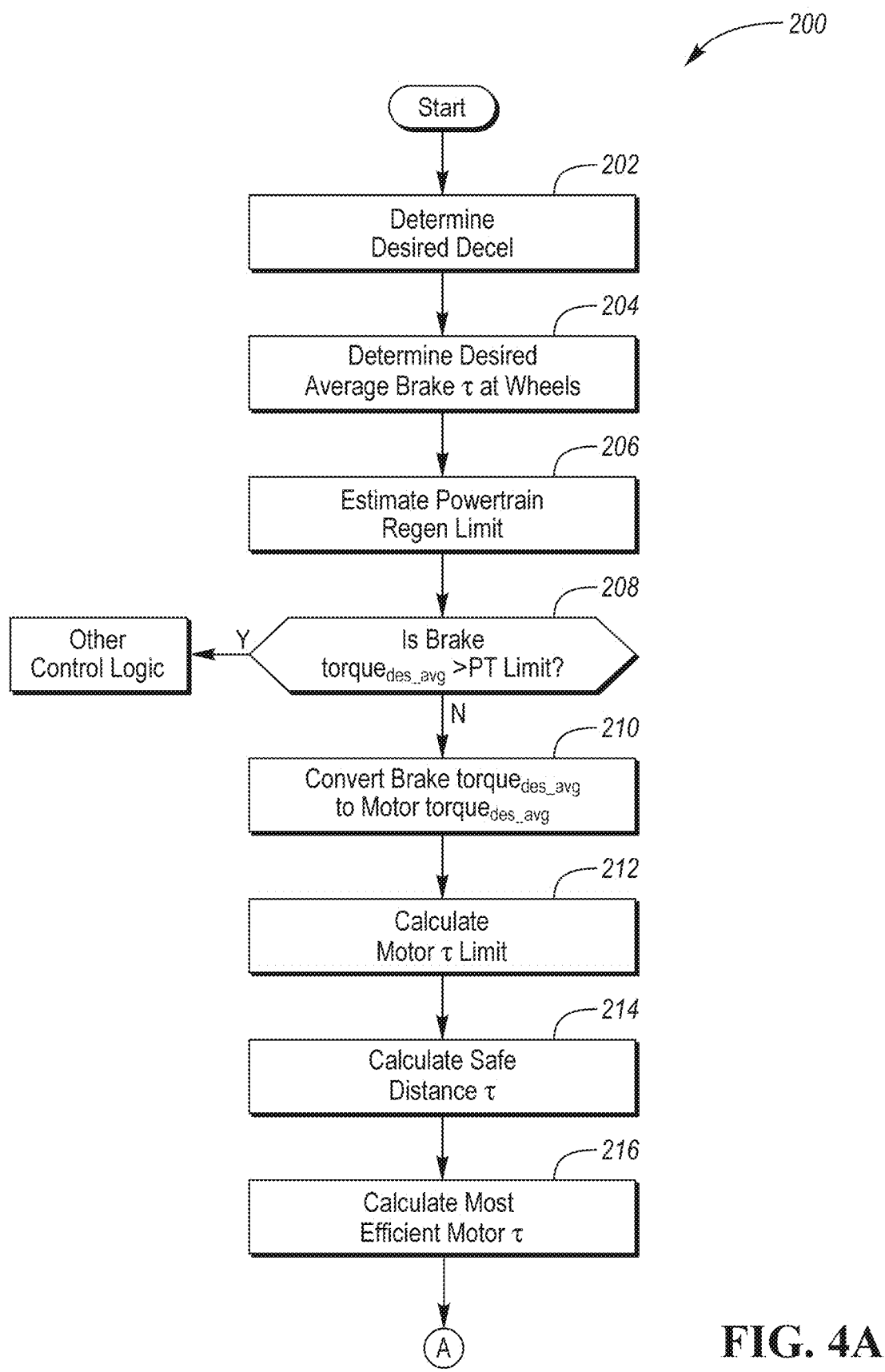
FIGS. 4A and 4B illustrate a flow chart of an algorithm for generating a braking torque profile to be used during a braking event of the vehicle.
Figure 4B:
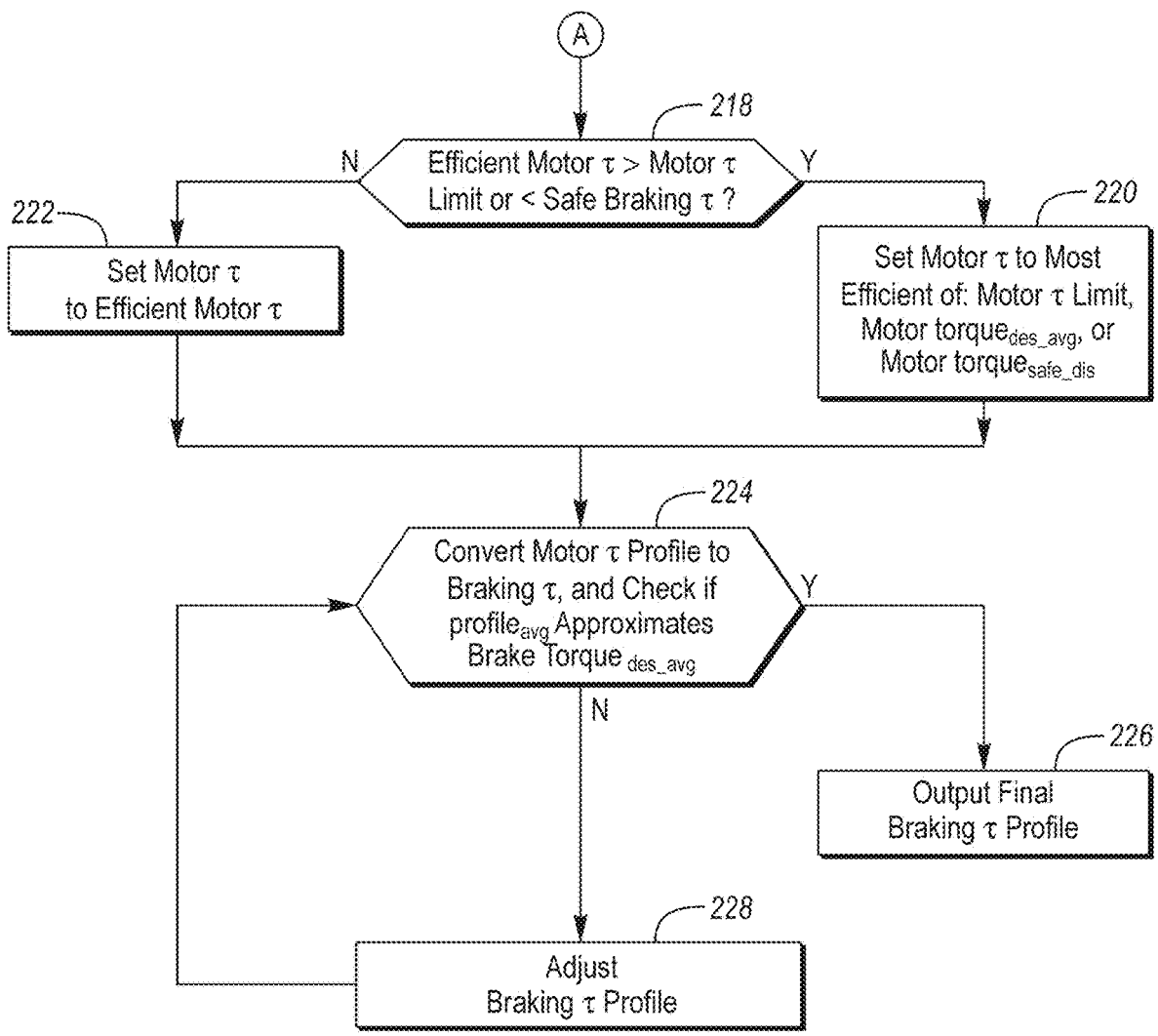
Figure 5:
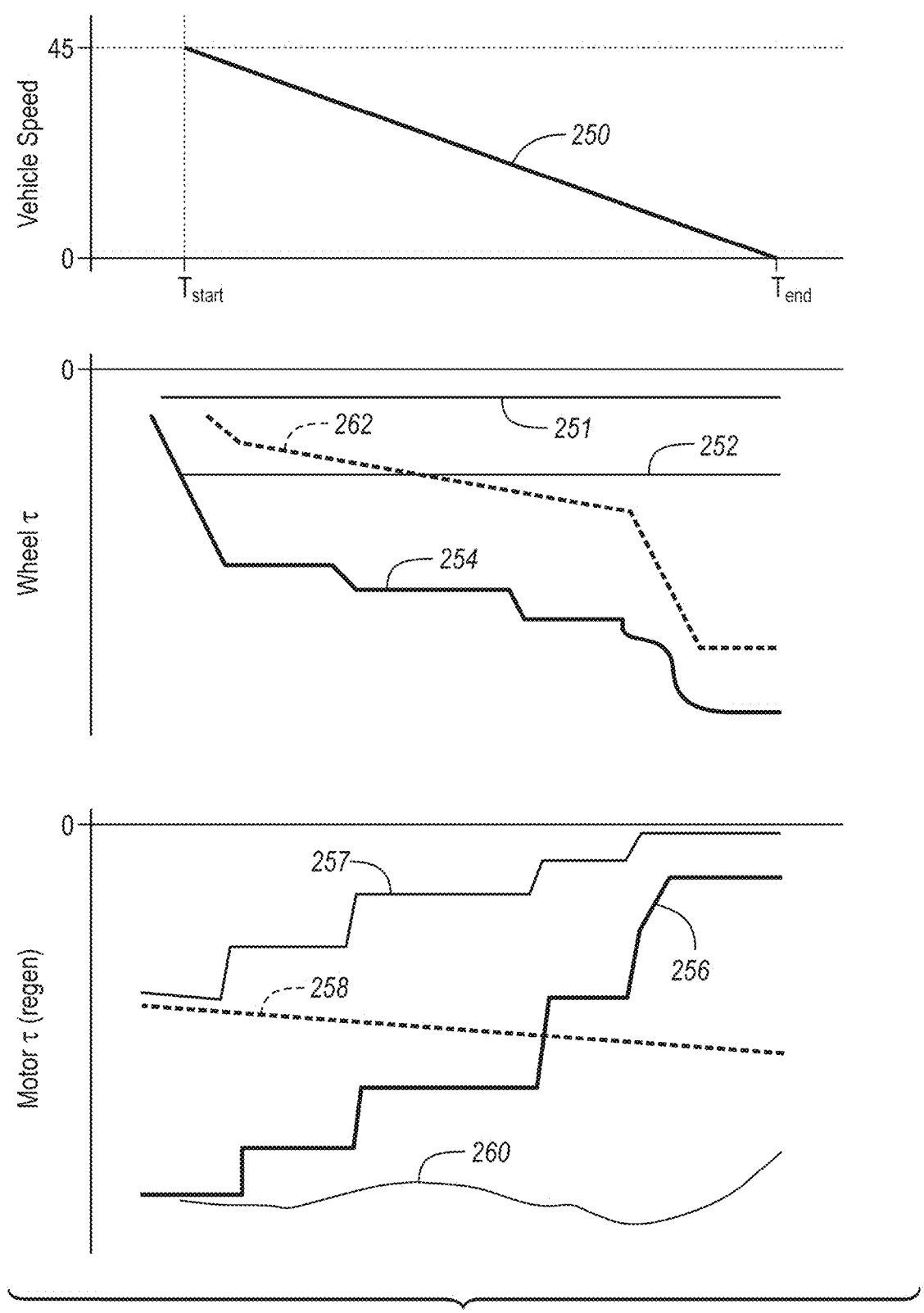
FIG. 5 is a graph showing a braking event and includes a plurality of traces that represent different parameters of the braking event.

FIGS. 4A and 4B illustrate an algorithm 200 for constructing a vehicle torque profile to be used during an autonomous braking event. The steps of the algorithm will be explained in conjunction with the plots of FIG. 5 and the motor efficiency map of FIG. 6. The algorithm 200 is initiated in response to an autonomous braking event of the vehicle being requested. At operation 202, the controller determines a desired deceleration 250 of the vehicle during the braking event, which in the illustrated embodiment is an autonomous or semi-autonomous vehicle automatically braking for a stop sign. Of course, other types of braking events are contemplated. At operation 204, the controller determines a desired braking torque profile at the wheels for the desired deceleration 250, and the controller calculates the average of the brake torque profile (brake torque$_{des\_avg}$) shown as trace 252. As used herein, braking torque refers to torque at the wheels, i.e., in the wheel domain, whereas regenerative torque refers to torque at the M/G, i.e., the motor domain.

At operation 206, the controller estimates the PT limit 254, which is at the wheels. As explained above, the PT limit may be based on the state of charge of the battery 20, the regenerative torque limits of the M/G 18, the brake stability limit, and the transmission capacity.

At operation 208, the controller determines if the brake torque$_{des\_avg}$ 252 is greater than the PT limit 254. If yes, this control strategy is exited and another control strategy is used. If no, control passes to operation 210, and the controller converts the brake torque$_{des\_avg}$ 252 into a motor torque (motor torque$_{des\_avg}$) 256. This may be done for each gear ratio of the transmission, or only for gear ratios expected to be used during the braking event. The controller may use equation 1 to convert brake torque to motor torque and vice versa. Said another way, equation 1 converts torque between the motor domain and the wheel domain.

$$\text{Motor } \tau = \frac{\text{Wheel } \tau}{(\text{Transmission ratio} \times \text{final driver ratio})} + /-\text{losses} \quad (\text{Eq. 1})$$

As can be seen by trace 256, the higher gears require a much larger motor torque than the lower gears to achieve a similar braking torque at the wheels. Thus, if the vehicle 10 were commanded to regeneratively brake according to the average brake torque 252 in all gears, the M/G 18 would have to be operated at a much higher torque for the upper gears and at a much lower torque in the lower gears.

Figure 6:
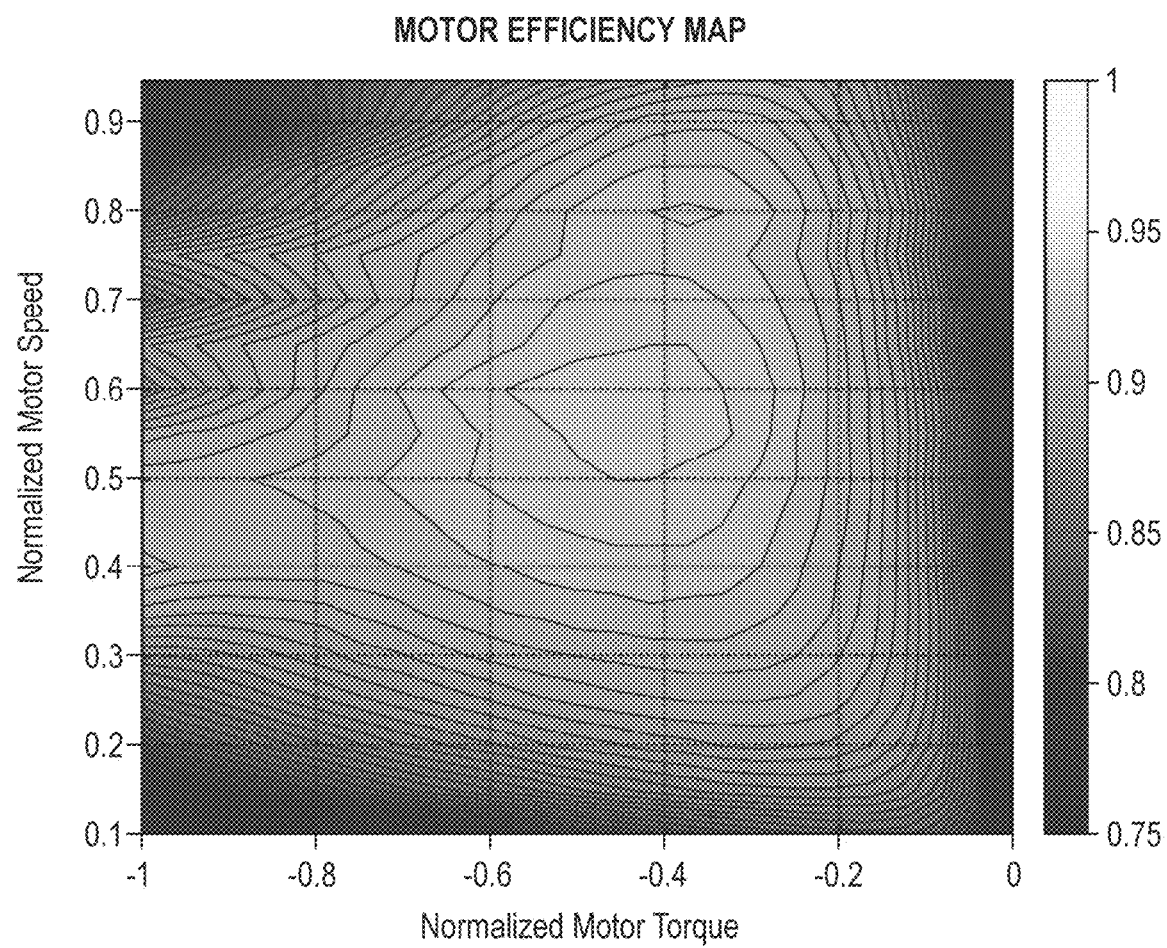
FIG. 6 is an efficiency map for an electric machine according to one embodiment.

Electric machines, such as M/G 18, vary in efficiency according to torque and speed of the electric machine. FIG. 6 illustrates an example efficiency map for the M/G 18. The M/G 18 is generally more efficient when the regenerative torque is in a medium range rather than at the minimum and maximum regenerative torques. For a known range of motor speeds, the efficiency map may be used to choose more efficient regenerative torques in order to recapture more power during regenerative braking. As will be discussed in more detail below, regenerative braking efficiency may be improved by commanding different motor torques for different gears of the transmission so that the commanded motor torque is in a more efficient range of the M/G 18.

At operation 212, the controller calculates the regenerative torque limit 260 for the M/G 18, i.e., maximum regenerative torque, in the motor domain. At operation 214, the controller calculates a minimum braking torque in the wheel domain (wheel$_{safe\_dis}$) needed to maintain a safe following distance between the vehicle 10 and a forward object, such as a lead vehicle. This torque is shown as trace 251. For each gear ratio or a select number of gear ratios, the wheel$_{safe\_dis}$ may be converted from the wheel domain to a safe distance torque in the motor domain (mot$_{safe\_dis}$) to determine a minimum torque required at the M/G 18 for the various gear ratios. This torque is shown as trace 257.

At operation 216, the controller calculates the most efficient motor torque to use for regenerative braking. This may be calculated for each gear ratio of the transmission, or only for gear ratios expected to be used during the braking event. Electric machines have efficiency maps, such as that illustrated in FIG. 6, that indicate motor efficiency based on the motor speed and the motor torque. As can be seen in FIG. 6, the M/G 18 is most efficient for median torques and speeds and is less efficient at the corners. FIG. 6 is merely one example of an efficiency map and the precise efficiencies for the electric machines will vary according to the specific designs of that machine. The efficiency map may be stored in a lookup table and utilized by the controller at operation 216 to calculate the most efficient motor torque. The speeds of the M/G 18 will be known during the braking event according to a transmission shift schedule and vehicle speed, and thus the controller can optimize the torque values commanded to the M/G 18 during the regenerative braking event. The most efficient motor torque for the example regenerative braking event is illustrated as trace 258. Comparing the most efficient torque 258 to the torque curve 256, it can be seen that commanding the vehicle to brake at the average brake torque 252 is inefficient, especially at the higher and lower gear ratios. Regenerative braking efficiency can be increased by reducing a magnitude of the motor torque for the upper gear ratios and increasing the magnitude of the motor torque for the lower gears ratios. But, modifying the commanded motor torque affects the braking torque at the wheels and thus the modification can only be done if it is safe to do so, i.e., the vehicle will maintain a safe following distance from a forward object such as a vehicle or will stop at the desired location.

At operation 218, the controller determines if the most efficient torque 258 is greater than the motor torque limit 260, or if the most efficient torque 258 is less than motor$_{safe\_dis}$ 257. This is done for each of the gear ratios, or for only the gear ratios predicted to be used during the braking event. If yes, the most efficient torque 258 cannot be used, at least for that gear ratio, and the controller sets the motor torque for that gear ratio to the most efficient of: (i) the motor regenerative limit 260, (ii) the motor torque$_{des\_avg}$ 256, or (iii) the motor$_{safe\_dis}$ 257 the at operation 220. The controller does this for the various gear ratios to create a torque profile in the motor domain. If no at operation 218, control passes to operation 222 and the controller sets the motor torque to the most efficient motor torque 258 for the various gear ratios to create a motor torque profile. Control then passes to operation 224.

At operation 224, the controller converts the motor torque profile, from operation 220 or 222, to a braking torque profile, which is in the wheel domain. The controller then calculates an average braking torque (profile$_{avg}$) of the braking torque profile and compares the profile$_{avg}$ to the brake torque$_{des\_avg}$ 252. If they match, or their averages are within a predefined tolerance (i.e., the profile$_{avg}$ is within a specified range of brake torque$_{des\_avg}$ 252), a final braking torque profile 262 is output at operation 226. The predefined tolerance is a calibratable value that may vary vehicle to vehicle due to different vehicles having a different deceleration differences for a given braking torque difference.

If the difference between profile$_{avg}$ and the brake torque$_{des\_avg}$ 252 is greater than the predefined tolerance control passes to operation 228 and the controller adjusts the profile and sends the revised profile back to operation 224. This adjusting process is repeated for as many iterations as is necessary until the difference between profile$_{avg}$ and brake torque$_{des\_avg}$ 252 is within the predefined tolerance.

The adjusting process is based on the transmission shift schedule, which is set independently of regenerative braking. The adjusting process may include a steady offset, i.e., increase or decrease torque, from the most efficient torque 258 across the different gears. Alternatively, the offset may be gear dependent with each gear having its own offset. For example, the offsets used in the upper gears may have a greater magnitude than in the lower gears to provide a more consistent deceleration.

The final braking torque profile 262 may be used by a low level controller responsible for sending torque commands to the M/G 18. The low level controller may command the M/G 18 to apply a regenerative torque according to the profile 262 to effectuate braking of the vehicle. The low level control, or another controller, may convert the final braking torque profile 262, which is in the wheel domain, to a motor torque that is commanded to the M/G 18.

In an alternative embodiment, an algorithm similar to algorithm 200 may output a speed profile for the vehicle during the braking event. The speed profile may be used by a low level controller to send a command to the motor to apply a regenerative torque according to the profile to effectuate braking of the vehicle. The speed profile may first be converted into a braking torque in the wheel domain and subsequently converted into a motor torque that can be commanded to the M/G 18.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
   a motor; and
   a controller programmed to, responsive to an autonomous braking request and a predicted average braking torque associated with the request having a magnitude less than a powertrain regenerative torque limit,
   generate a desired torque profile of the motor for the braking event based on an efficiency map of the motor,
   convert the desired torque profile to a desired braking torque profile, and
   brake the vehicle only with the motor according to the desired torque profile responsive to (i) the desired torque profile being less than a torque limit of the motor and (ii) a difference between the predicted average braking torque and an average of the desired braking torque profile being less than a threshold.

2. The vehicle of claim 1 further comprising a step-ratio transmission including multiple discrete gear ratios.

3. The vehicle of claim 2, wherein the desired torque profile has a first magnitude that is commanded to the motor when the transmission is in one of the gear ratios and has a second magnitude used when the transmission is in another of the gear ratios.

4. The vehicle of claim 2, wherein the transmission includes a torque converter coupled to the motor.

5. The vehicle of claim 1 further comprising an engine and a disconnect clutch, wherein the disconnect clutch is configured to selectively couple the motor to the engine.

6. The vehicle of claim 1, wherein the controller is further programmed to, responsive to the desired torque profile being less than a torque required to maintain a desired following distance to a forward object, brake the vehicle only with the motor according to a second torque profile that has at least one magnitude equal to the torque required to maintain a desired following distance.

7. The vehicle of claim 1, wherein the controller is further programmed to, responsive to the desired torque profile being less than a torque required to maintain a desired following distance to a forward object, brake the vehicle only with the motor according to a second torque profile that has at least one magnitude equal to the torque required to maintain a desired following distance.

8. A method of regeneratively braking an autonomous vehicle comprising:
   generating a speed profile of a vehicle for a braking event,
   determining an average braking torque, at the wheels, corresponding to the speed profile,
   generating a desired torque profile of a motor for the braking event based on an efficiency map of the motor,
   converting the desired torque profile to a desired braking torque at the wheels,
   determining an average of the desired braking torque, and
   braking the vehicle only with the motor according to the desired torque profile responsive to (i) the desired torque profile being less than a torque limit of the motor and (ii) a difference between the average braking torque and the average of the desired braking torque being less than a threshold.

9. The method of claim 8, wherein the desired torque profile has a first magnitude that is commanded to the electric machine when a transmission of the vehicle is in a first gear ratio and has a second magnitude that is commanded to the electric machine when the transmission is in a second gear ratio.

10. The method of claim 8 further comprising:
    responsive to the predicted autonomous braking event being requested and the predicted average braking torque of the braking event having a magnitude greater than the regenerative torque limit of the vehicle, braking the vehicle only with the electric machine according to a torque profile that has at least one magnitude set to the regenerative torque limit.

11. The method of claim 8 further comprising:
responsive to the most efficient torque profile being less than a torque required to maintain a desired following distance to a forward object, braking the vehicle only with the electric machine according to a torque profile that has at least one magnitude equal to the torque required to maintain a desired following distance.

12. A vehicle comprising:
a motor;
wheels driveably connected to the motor; and
a controller programmed to, responsive to an autonomous braking request:
   generate a speed profile of the vehicle for the braking event,
   determine an average braking torque, at the wheels, corresponding to the speed profile,
   generate a desired torque profile of the motor for the braking event based on an efficiency map of the motor,
   convert the desired torque profile to a desired braking torque at the wheels,
   determining an average of the desired braking torque, and
   brake the vehicle only with the motor according to the desired torque profile responsive to (i) the desired torque profile being less than a torque limit of the motor and (ii) a difference between the average braking torque and the average of the desired braking torque being less than a threshold.

13. The vehicle of claim 12 further comprising a step-ratio transmission including multiple discrete gear ratios.

14. The vehicle of claim 13, wherein the desired torque profile has a first magnitude that is commanded to the motor when the transmission is in one of the gear ratios and has a second magnitude used when the transmission is in another of the gear ratios.

15. The vehicle of claim 13, wherein the transmission includes a torque converter coupled to the motor.

16. The vehicle of claim 13 further comprising an engine and a disconnect clutch, wherein the disconnect clutch is configured to selectively couple the motor to the engine.

* * * * *